US007147707B2

(12) United States Patent
Murakami et al.

(10) Patent No.: US 7,147,707 B2
(45) Date of Patent: Dec. 12, 2006

(54) COMPOSITE FOR BUILDING MATERIAL, AND METHOD OF MANUFACTURING BUILDING MATERIAL USING THE SAME

(75) Inventors: Hiroshi Murakami, Kyoto (JP); Yoshiyuki Suzuki, Ohtsu (JP); Masami Gotou, Ishikawa (JP)

(73) Assignee: Kanazawa Institute of Technology, Ishikawa (JP)

( * ) Notice: Subject to any disclaimer, the term of this patent is extended or adjusted under 35 U.S.C. 154(b) by 0 days.

(21) Appl. No.: 11/317,389

(22) Filed: Dec. 22, 2005

(65) Prior Publication Data

US 2006/0130710 A1 Jun. 22, 2006

Related U.S. Application Data

(63) Continuation-in-part of application No. 11/149,382, filed on Jun. 9, 2005, now abandoned, which is a continuation of application No. 10/370,318, filed on Feb. 19, 2003, now abandoned.

(30) Foreign Application Priority Data

Mar. 11, 2002 (JP) ............................ 2002-064614
Aug. 29, 2002 (JP) ............................ 2002-250677

(51) Int. Cl.
C04B 14/08 (2006.01)
C04B 18/26 (2006.01)
C04B 28/02 (2006.01)
B28B 3/00 (2006.01)
B28C 5/00 (2006.01)

(52) U.S. Cl. ...................... 106/720; 106/606; 106/607; 106/718; 106/719; 106/721; 106/811; 106/812; 264/333

(58) Field of Classification Search ................ 106/606, 106/607, 718, 720, 721, 719, 811, 812; 264/333
See application file for complete search history.

(56) References Cited

U.S. PATENT DOCUMENTS

| | | | | |
|---|---|---|---|---|
| 1,524,676 | A | * | 2/1925 | Stowell ...................... 106/619 |
| 4,150,185 | A | * | 4/1979 | Prymelski ................... 428/113 |
| 4,225,359 | A | | 9/1980 | Schneider |
| 5,782,970 | A | * | 7/1998 | Zawada ...................... 106/681 |

FOREIGN PATENT DOCUMENTS

| | | | |
|---|---|---|---|
| EP | 1 344 756 | | 9/2003 |
| FR | 1127634 A | * | 12/1956 |
| JP | 08208303 | | 8/1996 |
| JP | 2000-220247 | | 8/2000 |
| JP | 2000220247 | | 8/2000 |
| JP | 2000-274057 | | 10/2000 |
| JP | 2000302535 | | 10/2000 |
| JP | 2001287979 | | 10/2001 |
| JP | 2002-483 A | * | 1/2002 |
| RO | 111928 | | 3/1997 |

OTHER PUBLICATIONS

Database Chemabs 'Online! Chemical Abstracts Service, Columbus, Ohio, US; Tudose, Ioan et al: "Composition for semi-lightweight and lightweight concretes based on portland cement and mineralized organic aggregate" XP002245486 retrieved from STN Database accession No. 132:338447 *abstract* & RO 111 928 A (I. Tudose et al.) Mar. 31, 1997.

Database Chemabs 'Online! Chemical Abstracts Service, Columbus, Ohio, US; Takagi, Mitsuaki et al: "Tatami mats with good moisture absorbing and releasing properties" XP002245487 retrieved from STN Database accession No. 133:283638 *abstract* & JP 2000 274057 A2 (National House Industrial Co., Ltd., Japan) Oct. 3, 2000.

* cited by examiner

*Primary Examiner*—Anthony J. Green
(74) *Attorney, Agent, or Firm*—Jordan and Hamburg LLP

(57) ABSTRACT

To provide a composite for a building material capable of manufacturing a building material that is harmless to living environment and global environment and can be recycled. The composite for a building material contains diatomaceous earth, waste lumber, and inorganic hardener, or further contains field earth, and, as necessary, contains used paper and/or crushed pieces of used tatami mat and used tile, and crushed earth. The composite for a building material is prepared by homogeneously mixing the components, and then the building material is manufactured by molding and curing the composite. The manufactured building material has a high humidity conditioning property as in the case of the conventional mud wall made of coarse clay, and is easily recycled by being crushed. Moreover, this building material does not cause hypersensitiveness to chemical substances because it produces no chemical substances, and has a feel of earth so that earthen walls and flower beds made by using this building material integrate well with an appearance of ancient city and are in harmony with beautiful appearance of houses properly.

12 Claims, 2 Drawing Sheets

COMPOSITE FOR BUILDING MATERIAL, AND METHOD OF MANUFACTURING BUILDING MATERIAL USING THE SAME

RELATED APPLICATIONS

This is a Continuation-in-Part of Ser. No. 11/149,382 filed Jun. 9, 2005, now abandoned, which is a Continuation of Ser. No. 10/370,318 filed Feb. 19, 2003, now abandoned.

BACKGROUND OF THE INVENTION

1. Field of the Invention

The present invention relates to a composite for a building material and a method of manufacturing a building material using the composite. More particularly, it relates to a composite for a building material such as a rough wall panel for a bearing wall, a heat-insulating/soundproof panel, and a block material for a mud wall and a flower bed, and a method of manufacturing a building material using the composite.

2. Description of the Related Art

Nowadays, plastic boards, and inorganic boards such as calcium silicate boards and gypsum boards are used as a building material in large numbers. However, the plastic board causes hypersensitiveness to chemical substances due to chemical substances such as formalin generated from the board, which presents a big social problem. Also, for the inorganic board, whose low cost and high function have been realized and which has been capable of being mass-produced, it is difficult to recycle the board after use, and the board is disposed of as industrial wastes without being treated, which presents a big problem. On the other hand, the effective use of various industrial wastes has recently been studied from the viewpoint of global environmental protection. For example, a building material using paper making sludge has been proposed in Japanese Patent Laid-Open No. 2001-11799, an example in which used paper having been broken to pieces and wastes of used synthetic resin sheets are used has been proposed in Japanese Patent Laid-Open No. 2000-302535, and an example in which waste casting sand is used has been proposed in Japanese Patent Laid-Open No. 2000-220247. In any case, however, like the plastic board and inorganic board, the problem of hypersensitiveness to chemical substances and the problem of disposal as industrial wastes after use remain unsolved. Contrarily, a mud wall, etc. using clay, which have been used from ancient times in Japan, not only provide a comfortable living environment in Japan's hot and humid environment because of their high humidity conditioning property but also present little of the problem of disposal as industrial wastes because of its ease of recycling. However, the mud wall, etc. using clay require a long period of time for their work, and also have poor resistance to earthquake, so that the demand for them has decreased year by year.

In view of such a present situation, the inventors have continued studies earnestly and resultantly have found the fact described below. If a building material is manufactured by using a composite for a building material containing diatomaceous earth, waste lumber, and inorganic hardener for cement mud wall, or a composite for a building material further containing field earth, used paper, etc., a building material can be obtained which has a high humidity conditioning property and thus provides a comfortable living environment as in the case of the conventional mud wall, and is easily recycled; for example, it can be reused merely by crushing the obtained building material, and is harmless to global environment because industrial wastes, for example, waste lumber such as lumber chip, sawdust, shavings, and crushed pieces of fallen tree, used paper and/or crushed pieces of used tatami mat and used tile, and crushed earth can also be used as a raw material. As the result of the findings, we completed the present invention.

SUMMARY OF THE INVENTION

An object of the present invention is to provide a composite for a building material containing diatomaceous earth, waste lumber, and inorganic hardener for cement mud wall.

Another object of the present invention is to provide a composite for a building material containing diatomaceous earth, waste lumber, field earth, and inorganic hardener for cement mud wall.

Still another object of the present invention is to provide a composite for a building material containing diatomaceous earth, waste lumber, field earth and inorganic hardener for cement mud wall, and industrial wastes such as used paper and/or crushed pieces of used tatami mat and used tile, and crushed earth as a raw material.

Still another object of the present invention is to provide a composite for a building material which is harmless to living environment and global environment and is easily recycled.

Yet another object of the present invention is to provide a method of manufacturing a building material using the above-described composite for a building material.

The building material obtained from the above-described composite for a building material has a high humidity conditioning property as in the case of the conventional mud wall made of coarse clay because its raw material is a natural material, and is easily recycled by being crushed. Moreover, this building material does not cause hypersensitiveness to chemical substances because it produces no chemical substances, and has a feel of earth so that earthen walls and flower beds made by using this building material integrate well with the appearance of ancient city and are in harmony with beautiful appearance of houses properly.

DETAILED DESCRIPTION OF THE PREFERRED EMBODIMENTS

Figure 1:
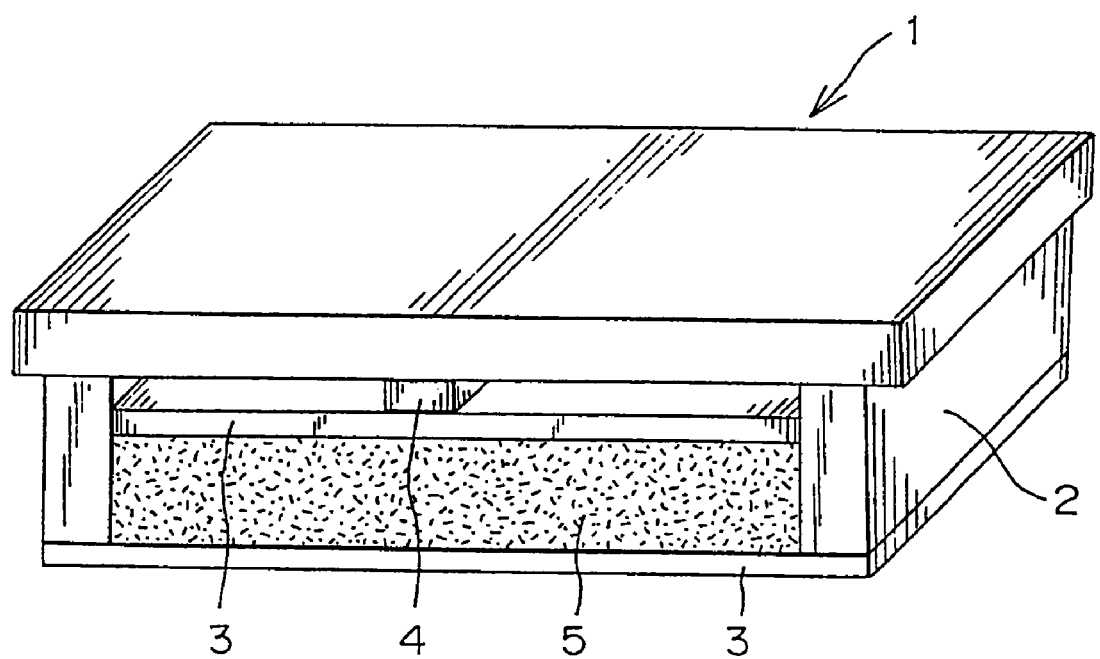
FIG. 1 is a schematic view of a mold for manufacturing a rough wall panel in accordance with the present invention.

The present invention that attains the above objects relates to a composite for a building material containing diatomaceous earth, waste lumber, and inorganic hardener for a cement mud wall, or further containing field earth, etc., and a method of manufacturing a building material using the composite.

The composite for a building material in accordance with the present invention is, as described above, a composite material for a building material containing diatomaceous earth, waste lumber, and inorganic hardener for cement mud wall or containing diatomaceous earth, waste lumber, field earth, and inorganic hardener for cement mud wall, or further containing industrial wastes such as used paper, crushed pieces of used tatami mat and used tile, and crushed earth. The content of the diatomaceous earth is 10 to 50 wt % of all the components, the content of the waste lumber is 5 to 30 wt %, and the content of the inorganic hardener for cement mud wall is 10 to 80 wt %. If the content of the diatomaceous earth is lower than 10 wt %, the strength of building material is undesirably insufficient. If the content of the diatomaceous earth exceeds 50 wt %, the hardness of building material is too high, which makes nailing and sawing difficult to do. If the content of the waste lumber is lower than 5 wt %, it is difficult to nail and saw the building material, and the humidity conditioning property is low. If the content of the waste lumber exceeds 30 wt %, the strength undesirably decreases. Further, if the content of the inorganic hardener for cement mud wall is lower than 10 wt %, the strength of building material is insufficient, and if the content of the inorganic hardener for cement mud wall exceeds 80 wt %, the building material is undesirably too hard. As the diatomaceous earth, commercially available diatomaceous earth is used. As the waste lumber, lumber chip, sawdust, shavings, etc. can be used, and they are preferably used by being crushed as necessary to obtain a homogeneous mixture. As inorganic hardener for cement mud wall can be used, for example, a composition consisting of within the indicated percentage ranges: Portland cement, about 45 to about 60 wt %; an inorganic rapid-curing agent, about 20 to about 27 wt %; an inorganic shrinkage-retarding agent, about 8 to about 10 wt %; an organic pigment, about 10 to about 13 wt %; a powder of silica about 5 to about 7 wt %; and an surface-active agent, about 0.7 to about 0.9 wt %. Preferably, the foregoing example is a composition consisting of Portland cement, about 48.4 wt %; an inorganic rapid-curing agent, about 24.2 wt %; an inorganic shrinkage-retarding agent, about 8.8 wt %; an inorganic pigment, about 12 wt %; a powder of silica about 6 wt %; and an surface-active agent, about 0.8 wt % (manufactured by Chichibu Concrete Industry Co., Ltd.,). As another aspect of the present invention, the composite for a building material contains field earth. The field earth means clayey earth taken from paddy fields and plowed fields. The containing of field earth makes the water holding property of building material high, increases the strength thereof after drying, and makes the building material superior in coloring. As the field earth, Arakida earth and Kyofukakusa earth can be used, and Kyofukausa earth is especially preferable. The content of the field earth should be in the range of 5 to 40 wt %. If the content of the field earth is lower than 5wt %, no effect is achieved, and if the content of the field earth exceeds 40 wt %, the strength decreases undesirably. In addition to the above-described components, the composite for a building material in accordance with the present invention can contain 10 to 30 wt % of industrial wastes such as used paper and/or crushed pieces of used tatami mat and used tile, and crushed earth. If the content of the industrial wastes is lower than 10 wt %, the reuse effect of resources is little, and if the content of the industrial wastes exceeds 30 wt %, the strength of building material decreases undesirably. As the crushed earth, crushed pieces of mud wall, crushed pieces of building material in accordance with the present invention, etc. can be used.

The following is a description of a method of manufacturing a building material in accordance with the present invention. The method will be carried out as described below. Diatomaceous earth and waste lumber or diatomaceous earth, waste lumber and field earth are mixed with water, and further, as necessary, industrial wastes such as used paper and/or crushed pieces of used tatami mat and used tile or crushed earth, and an antibacterial agent and an insecticide are mixed. After the mixture is sufficiently agitated, an inorganic hardener for cement mud wall is put into the mixture just before molding, by which a composite for a building material is prepared and is formed into a panel or a block, and then is dried and cured. As a molding method used in the above-described manufacturing method, slip casting method in which a composite for a building material is slip cast into a mold and a pressure is applied, an extrusion molding method in which a composite for a building material is extruded from an extruding machine, or the like molding method can be used. In manufacturing a large panel such as a rough wall panel for a bearing wall and rough wall panel for heat insulation, the slip casting method is preferable because molding is easy to do in this method. In the slip casting method, as shown in FIG. 1, a frame 2 of a panel size is prepared by using square steel materials, pressing plates 3 of waterproof plywood are arranged at the upper and lower part of the frame 2, and a joggle connection 4 is provided at one place, by which a mold 1 is formed. The prepared composite for a building material is cast into the mold 1, and a weight of 50 to 200 kg is placed on the pressing plate 3 to dry and cure the composite. The mold is released, and the composite is cured in an air-conditioned room to be finished into a product. In particular, in the case where the rough wall panel for a bearing wall is manufactured, it is preferable that a wooden lath plate be embedded to increase the strength when the composite for a building material is slip cast. As the wooden lath plate, a plate-shaped body in which narrow wooden plates are combined into a net shape is used, and the number of embedded wooden lath plates may be in the range of one to three.

Because of its high productivity, the extrusion molding method of the above-described molding methods is used suitably for a block of clayey wall, flower bed, etc. and small heat-insulating/soundproof panel, etc. The extrusion pressure of the extrusion molding machine should be in the range of about 2 to 80 MPa, preferably in the range of 3 to 60 MPa. Also, heating of the composite for a building material to a temperature of 40 to 250° C. before extrusion molding is preferable because the drying process can be carried out smoothly.

As the dry curing method after molding, ventilation dry curing, heated-air dry curing, dry curing under reduced pressure, etc. at an ordinary temperature during three to ten days can be performed. Among them, natural drying such as ventilation dry curing is preferable. In the heated-air dry curing, a temperature in the range of 40 to 250° C., preferably 80 to 200° C. is selected.

As the agitation method used to prepare the composite for a building material, a preform method, a premix form method, a mix form method, etc. can be used. Also, as an agitator, an omni mixer, a Henshel mixer, etc. can be used.

Although the building material manufactured as described above is antibacterial, in order to provide a higher antibacterial property, a publicly-known antibacterial agent should preferably be mixed. The antibacterial agent used may be a synthetic substance or may be a natural substance. Concretely, fenitrothion, fenitron, chlorbenzylate, diazinon, pyrethrum, etc. can be cited. This antibacterial agent is mixed as liquid or powder.

Next, the present invention will be described concretely with reference to examples. The present invention is not limited to these examples. The physical properties such as compressive strength in the following examples complied with the concrete compression test (JIS A 1108), the cement physical test (JIS R 5201),and the test method for a wooden framework bearing wall in accordance with item (c) in Table 1 in Sub-Section 4 of Section 46 of Enforcement Ordinance of Japanese Building Standards Act.

EXAMPLE 1

Figure 2:
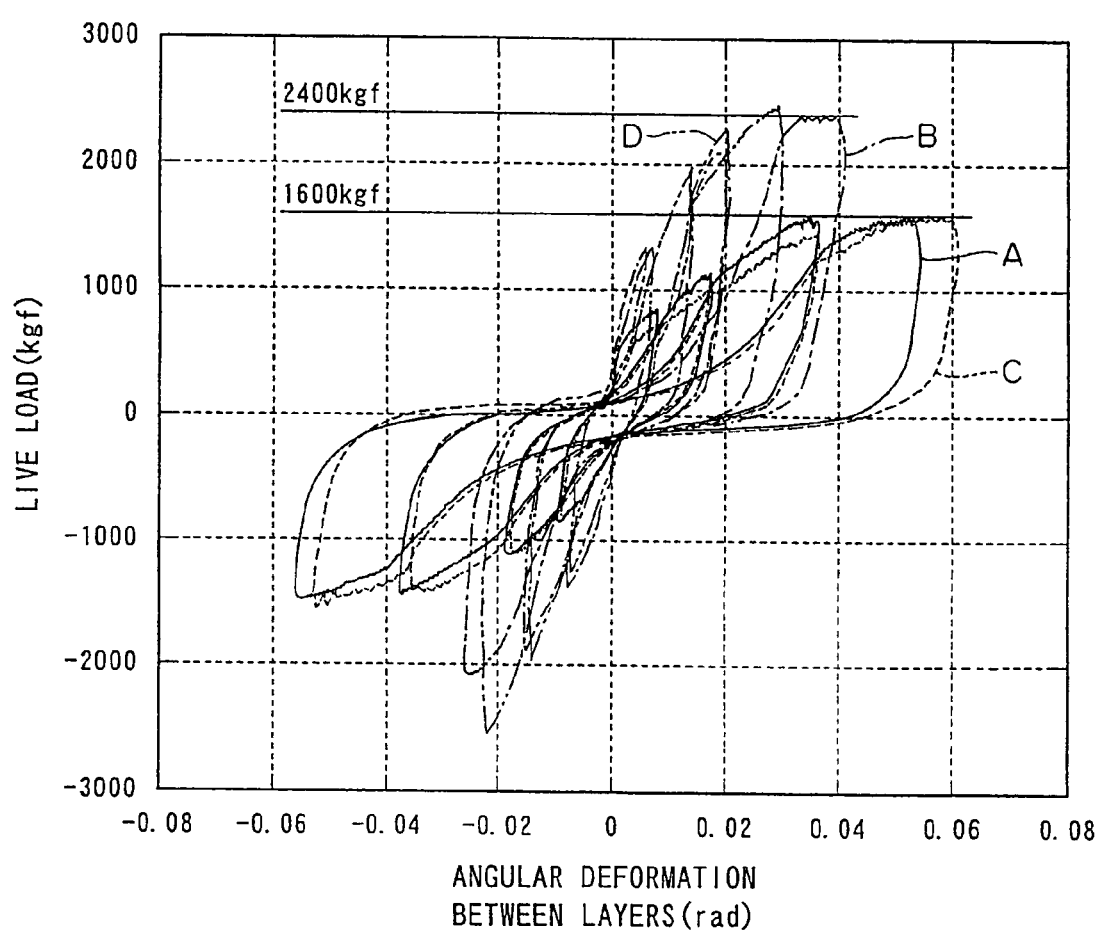
FIG. 2 is a graph showing a load test result of a rough wall panel in accordance with the present invention. In the FIG. 2, reference mark A is no chip contained, vertical arrangement, reference mark B is no chip contained, horizontal arrangement, reference mark C is a chip contained, vertical arrangement and reference mark D is a chip contained, horizontal arrangement.

Two kilograms of diatomaceous earth, 1 kg of lumber chip, and 60 liters of water were put into a mixer, and the mixture was agitated for 30 minutes. After 20 liters of water was further added, 5 kg of inorganic hardener for cement mud wall (manufactured by Chichibu Concrete Industry Co., Ltd., as identified previously) was put in the mixture and was mixed sufficiently to prepare a composite for a building material. A half amount of the composite for a building material was poured into a mold made of square steel materials of 1800 mm×600 mm×30 mm, and one wooden lath plate (wooden lath plate measuring 6 mm×36 mm×1800 mm in which narrow wooden plates, five in the longitudinal direction and ten in the transverse direction, are combined into a net shape) was placed on the composite, and the remaining half amount was poured. Thereafter, the composite for a building material was cured for one day by being pressed using a pressing plate by placing a weight of 60 kg thereon. After mold releasing, the composite was dried naturally on a drying rack, by which a rough wall panel for a bearing wall of 1800 mm×600 mm×26 mm was manufactured. The strength of the panel was measured by the test method for a wooden framework bearing wall in accordance with item (c) in Table 1 in Sub-Section 4 of Section 46 of Enforcement Ordinance of Japanese Building Standards Act. The test result was 2000 Kgf for horizontal arrangement, and 1500 Kgf for vertical arrangement. Also, the vertical arrangement and horizontal arrangement tests of the rough wall panel were conducted. As a result, it was found that this rough wall panel had a higher strength and a higher resistance to earthquake than a three-piece braced wall. Further, the angular deformation between layers relative to the load was examined, with the result that deformation was little. The result is shown in FIG. 2.

EXAMPLE 2

One kilogram of diatomaceous earth, 2 kg of Kyo-fukakusa earth, 1 kg of lumber chip, and 60 liters of water were put into a mixer, and the mixture was agitated for 30 minutes. After 30 liters of water was further added, 5 kg of inorganic hardener for cement mud wall (manufactured by Chichibu Concrete Industry Co., Ltd., ) was put in the mixture and was mixed sufficiently to prepare a composite for a building material. A half amount of the composite for a building material was poured into a mold made of square steel materials of about 1800 mm×600 mm×30 mm, and one wooden lath plate (described before) was placed on the composite, and the remaining half amount was poured. Thereafter, the composite for a building material was cured for one day by being pressed using a pressing plate by placing a weight of 60 kg thereon. After mold releasing, the composite was dried naturally on a drying rack, by which a rough wall panel for a bearing wall of 1800 mm×600 mm×26 mm was manufactured. The strength of the panel was measured by the test method for a wooden framework bearing wall in accordance with item (c) in Table 1 in Sub-Section 4 of Section 46 of Enforcement Ordinance of Japanese Building Standards Act. The test result was 2000 Kgf for horizontal arrangement, and 1500 Kgf for vertical arrangement. Also, the vertical arrangement and horizontal arrangement tests of the rough wall panel were conducted. As a result, it was found that this rough wall panel had a higher strength and a higher resistance to earthquake than a three-piece braced wall. Further, the angular deformation between layers relative to the load was examined, with the result that deformation was little. The result is shown in FIG. 2.

EXAMPLE 3

One kilogram of diatomaceous earth, 2 kg of Fukakusa earth, and 30 liters of water were put into a mixer, and the mixture was agitated for 30 minutes. After 3 kg of used paper, which was dipped in water of 30 liters, was put and mixed, and 30 liters of water was further added, 5 kg of inorganic hardener for cement mud wall (manufactured by Chichibu Concrete Industry Co., Ltd.,) was put in the mixture and was mixed sufficiently to prepare a composite for a building material.

Next, the composite for a building material was molded and cured in the same way as that of example 1, by which a rough wall panel for a bearing wall was manufactured. The strength of the panel was measured by the test method for a wooden framework bearing wall in accordance with item (c) in Table 1 in Sub-Section 4 of Section 46 of Enforcement Ordinance of Japanese Building Standards Act. The test result indicated that the strength was approximately equal to that of the rough wall panel of example 1. Also, the vertical arrangement and horizontal arrangement tests of the rough-coated wall panel were conducted. As a result, it was found that this rough wall panel had a higher strength and a higher resistance to earthquake than a three-piece braced wall. Further, the angular deformation between layers relative to the load was examined, with the result that deformation was less than that of example 2.

EXAMPLE 4

A composite for a building material with the composition given in Table 1 was prepared, and was poured into a mold made of square steel materials of about 900 mm×400 mm×30 mm, by which a heat-insulating panel measuring 900 mm×400 mm×26 mm was manufactured.

TABLE 1

(Unit: kg)

| | Diatomaceous earth | Chip | Hardener | Fukakusa earth | Used paper | Crushed earth | Water |
|---|---|---|---|---|---|---|---|
| Test piece 1 | 13.9 | 13.9 | 20.9 | 27.9 | 0 | 0 | 111.5 |
| Test piece 2 | 13.9 | 13.9 | 41.8 | 20.9 | 0 | 0 | 111.5 |
| Test piece 3 | 27.9 | 13.9 | 62.7 | 0.0 | 0 | 0 | 111.5 |
| Test piece 4 | 41.8 | 13.9 | 62.7 | 0.0 | 13.9 | 0 | 111.5 |
| Test piece | 13.9 | 13.9 | 41.8 | 20.9 | 0 | 13.9 | 111.5 |

Test pieces were prepared from the obtained panel, and a compression test was conducted. The result is given in Table 2.

TABLE 2

| Test piece No. | Maximum stress (Kgf/cm²) |
| --- | --- |
| 1 | 8.4 |
| 2 | 14.9 |
| 3 | 32.2 |
| 4 | 26.2 |
| 5 | 6.9 |

As described above, this heat-insulating panel has a high stress and a high resistance to earthquake, and also, unlike a plastic building material, does not cause hypersensitiveness to chemical substances because its raw material is a natural material. Therefore, it is useful as a backing material for interior work or the like.

What is claimed is:

1. A composite for a building material comprising:
   diatomaceous earth;
   waste lumber; and
   inorganic hardener for cement mud wall which is a composition consisting of within the indicated percentage ranges: Portland cement, about 45 to 60 wt %; an inorganic rapid-curing agent, about 20 to 27 wt %; an inorganic shrinkage-retarding agent, about 8 to 10 wt %; an organic pigment, about 10 to 13 wt %; a powder of silica, about 5 to 7 wt %; and a surface-active agent, about 0.7 to 0.9 wt %.

2. The composite for a building material according to claim 1, wherein said diatomaceous earth is 10 to 50 percent by weight, based on a total weight of the composite; said waste lumber is 5 to 30 percent by weight, based on a total weight of the composite and said inorganic hardener for cement mud wall is 10 to 80 percent by weight, based on a total weight of the composite.

3. The composite for a building material according to claim 1, further comprising field earth.

4. The composite for a building material according to claim 3, wherein said field earth is 5 to 40 percent by weight, based on the total weight of the composite.

5. The composite for a building material according to claim 1, wherein said composite further comprises at least one substance selected from the group consisting of: used paper; crushed pieces of used tatami mat; crushed pieces of used tile; and crushed earth.

6. The composite for a building material according to claim 5, wherein when at least one of said used paper, crushed pieces of used tatami mat; crushed pieces of used tile; and said crushed earth is present, the content of said used paper, said crushed pieces of used tatami mat; said crushed pieces of used tile; and crushed earth is 10 to 30 percent by weight, based on the total weight of the composite.

7. The composite of claim 1, wherein said inorganic hardener is a composition consisting of Portland cement, about 48.4 wt %; an inorganic rapid-curing agent, about 24.2 wt %; an inorganic shrinkage-retarding agent, about 8.8 wt %; an organic pigment, about 12 wt %; a powder of silica about 6 wt %; and a surface-active agent, about 0.8 wt %.

8. A method of manufacturing a building material, comprising;
   homogeneously mixing diatomaceous earth, waste lumber, and water to form a homogeneous mixture;
   mixing an inorganic hardener for cement mud wall with said homogeneous mixture, to produce a composite for a building material;
   molding the composite for a building material;
   curing the molded composite for a building material, to produce said building material;
   and wherein said inorganic hardener is a composition consisting of within the indicated percentage ranges: Portland cement, about 45 to 60 wt %; an inorganic rapid-curing agent, about 20 to 27 wt %; an inorganic shrinkage-retarding agent, about 8 to 10 wt %; an inorganic pigment, about 10 to 13 wt %, a powder of silica, about 5 to 7 wt %; and a surface-active agent, about 0.7 to 0.9 wt %.

9. A method of manufacturing a building material, comprising;
   homogeneously mixing diatomaceous earth, waste lumber, field earth, and water, to form a homogeneous mixture;
   mixing an inorganic hardener for cement mud wall with said homogeneous mixture, to produce a composite for a building material;
   molding the composite for a building material;
   curing the molded composite for a building material, to produce said building material
   and wherein said inorganic hardener is a composition consisting of within the indicated percentage ranges: Portland cement, about 45 to 60 wt %; an inorganic rapid-curing agent, about 20 to 27 wt %; an inorganic shrinkage-retarding agent, about 8 to 10 wt %; an organic pigment, about 10 to 13 wt %; a powder of silica, about 5 to 7 wt %; and a surface-active agent, about 0.7 to 0.9 wt %.

10. The method of manufacturing a building material according to claim 8 or 9, further comprising mixing at least one of; used paper; crushed pieces of used tatami mat; crushed pieces of used tile; and crushed earth with said homogeneous mixture.

11. The method of manufacturing a building material according to claim 8 or 9, wherein the said molding comprises slip casting of said composite for a building material.

12. The method of manufacturing a building material according to claim 8 or 9, wherein the said molding comprises extrusion molding of said composite for a building material.

* * * * *